(12) United States Patent
Taylor (10) Patent No.: US 7,345,097 B2
(45) Date of Patent: Mar. 18, 2008

(54) AUTOXIDISABLE ARCHITECTURAL COATING COMPOSITIONS

(75) Inventor: Philip Louis Taylor, Burnham (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/938,771

(22) Filed: Sep. 10, 2004

(65) Prior Publication Data

US 2005/0043426 A1 Feb. 24, 2005

(51) Int. Cl.
C09F 9/00 (2006.01)
C09D 167/02 (2006.01)
C09D 177/12 (2006.01)

(52) U.S. Cl. .................... 522/18; 522/20; 522/29; 522/164; 524/394

(58) Field of Classification Search ............... 522/28, 522/29, 47, 18, 20, 164; 524/394
See application file for complete search history.

(56) References Cited

U.S. PATENT DOCUMENTS

| | | | | |
|---|---|---|---|---|
| 3,941,759 A * | 3/1976 | Taylor et al. | ............... | 523/126 |
| 4,097,677 A * | 6/1978 | Emmons et al. | ............ | 560/220 |
| 4,387,190 A | 6/1983 | Feely | | |
| 4,424,252 A * | 1/1984 | Nativi | ................ | 428/209 |
| 4,447,567 A * | 5/1984 | Geerdes et al. | ............. | 523/501 |
| 4,571,420 A * | 2/1986 | Marks | .................. | 525/350 |
| 4,698,385 A * | 10/1987 | Schindler | ................. | 524/733 |
| 5,703,138 A * | 12/1997 | Cantor et al. | ................. | 522/29 |
| 5,759,252 A * | 6/1998 | Edelmann et al. | .......... | 106/310 |
| 5,777,024 A * | 7/1998 | Killilea et al. | .............. | 524/590 |
| 6,063,841 A * | 5/2000 | Link et al. | .................. | 523/505 |
| 6,075,088 A * | 6/2000 | Braeken | .................... | 524/590 |
| 6,150,429 A * | 11/2000 | Kovar et al. | ................... | 522/60 |
| 6,476,183 B2 * | 11/2002 | Bakkeren et al. | ........... | 528/376 |
| 6,548,565 B1 | 4/2003 | Van Den Berg | | |
| 2003/0096893 A1 * | 5/2003 | Boomgaard et al. | ........ | 524/236 |

FOREIGN PATENT DOCUMENTS

| | | |
|---|---|---|
| EP | 0 234 641 A1 | 9/1987 |
| EP | 0 428 124 A1 | 5/1991 |
| EP | 1 048 706 A1 | 11/2000 |

OTHER PUBLICATIONS

G.P.A. Turner, Oil and Alkyd Paints, Introduction to Paint Chemistry and Principles of Paint Technology, 1988, Third Edition, Chapman and Hall, London.
W.M. Morgans, Outlines of Paint Technology, 1982, vol. 1, Charles Griffin & Company LTD, London.

* cited by examiner

Primary Examiner—Susan Berman
(74) Attorney, Agent, or Firm—Roetzel & Andress LPA; George W. Moxon, II

(57) ABSTRACT

An autoxidisable architectural coating composition suitable for application to surfaces found in and around buildings at ambient temperatures and in natural daylight by unsophisticated users having no respiratory protection wherein surface autoxidation of the composition is promoted by a combination of low concentrations of metal ions (especially manganese or vanadium) and at least one photoinitiator. The composition avoids the need to use more than trace amounts cobalt ions which are rumoured to be carcinogenic yet achieves adequately fast rates of autoxidation. Preferably the use of cobalt is avoided altogether. The use of the low concentrations of the other metal ions reduces discolouration of the compositions often to levels below what is achieved using conventional cobalt promoters. It also improves gloss. Also a modification in which surface autoxidation is promoted by a combination of a photoinitiator and trace amounts of cobalt ions in the absence of other surface autoxidation promoting metal ions. Finally, a method for applying the autoxidisable coatings to surfaces under ambient temperatures in which they are subjected to natural daylight or similar low energy irradiation.

13 Claims, 5 Drawing Sheets

FIG.1

Irgacure 819

Irgacure 784

2-(4'-methoxy-1'-napthyl)-4,6-bis(trichloromethyl)-1,3,5-triazine

FIG.1(contd.)

isopropylthioxanthone acridine orange

FIG.2 rose bengale

3-butoxy-5,7-diiodo-6-fluorone

AUTOXIDISABLE ARCHITECTURAL COATING COMPOSITIONS

This application claims priority under 35 USC 119(a) to Great Britain patent application 0321140.6 filed on Sep. 10, 2003 hereby incorporated by reference in its entirety.

This invention relates to an autoxidisable architectural coating composition suitable for application by unsophisticated users having no special respiratory protection to surfaces at ambient temperatures (say 5 to 40° C.) in natural daylight which composition contains an autoxidisable binder polymer and a surface promoter system containing little or no cobalt for promoting surface autoxidation of the binder polymer.

BACKGROUND

Autoxidation of architectural coating composition takes place at ambient temperatures and in natural daylight and so occurs slowly unless it is accelerated by the presence of a both a surface promoter system and a through promoter system. Such promoters are often called "driers" but in this description they will be called "promoters" to avoid confusion with the more usual concept of drying which involves loss of solvent from the coating composition after it has been applied to a surface.

Architectural coating compositions such as paints, lacquers and varnishes which autoxidise at ambient temperatures in natural daylight are commonly used on site to coat surfaces found in or around buildings. Accordingly, the compositions are usually called "autoxidisable architectural coating compositions" and they need to be suitable for application at ambient temperatures in natural daylight by unsophisticated users having no respiratory protection and who use simple application tools such as brushes, rollers or pads. Once applied to a surface, the coating dries (in the sense of losing solvent by evaporation) and undergoes autoxidation promoted by various metal ions to form a solid coherent dried coat bonded to the surface.

Autoxidisable architectural coating compositions may comprise either autoxidisable binder polymer dissolved in organic solvent such as white spirit or dispersions of autoxidisable binder polymer in water. Generally, the compositions will also contain non-film-forming components such as particulate inorganic and/or organic pigments or opacifiers (for example particulate titanium dioxide, especially rutile or polymeric organic particles containing voids) or extenders (for example chalk, dolomite, clays or talc) as well as other optional ingredients such as matting agents (for example silica), structuring agents (for example titanium or zirconium chelates or laponite or bentonite clays), antifoaming agents and biocides. Pigment grade rutile particles are coated with other oxides such as silica in order to minimise degradation of the coating by light.

The autoxidisable film-forming binder polymer is an essential component of an autoxidisable architectural coating composition partly because it autoxidises to form the coherent coat which bonds to the surface to which it has been applied and partly because it binds together any non-film-forming components which may be present in the composition such as those described above. During autoxidation, autoxidisable moieties in the binder polymer are believed to form crosslinks between adjacent polymer chains resulting in a significant increase in the weight average molecular weight of the binder polymer.

The best known autoxidisable architectural coating compositions contain autoxidisable binder polymers which are alkyd resins. Alkyd resins are described on pages 211 to 218 and 228 and 229 of Volume 1 of the 2nd Edition of the book "Outlines of Paint Technology" by W M Morgans and published in 1988 by Griffin of London. The contents of these pages from Morgans are herein incorporated by reference. Morgans explains that, essentially, alkyd resins are condensates of dicarboxylic acids with polyhydric alcohols to which are attached long chain moieties containing autoxidisable ethylenic unsaturation. These long chain moieties are usually obtained from vegetable oils. Alkyd resins containing 60 to 85 wt % of the moieties are often called "long oil" alkyds whilst those containing 45 to 60 wt % are called "medium oil" alkyds and those with only 25 to 45 wt % are called "short oil" alkyds. Alkyd resins can be vulnerable to yellowing with age and so they should avoid the presence of cyclo-alkenyl moieties which aggravate the yellowing problem. Alkyd resins should also avoid oxidisable moieties such as allyl ether groups which degrade to give acrolein which is a potent and toxic lacrimator painful and possibly dangerous to users not having respiratory protection. Examples of autoxidisable moieties which are suitable include those derived from linseed oil, soya bean oil, safflower oil, cotton seed oil, dehydrogenated castor oil, tall oil and tung oil.

Examples of suitable dicarboxylic acids for use in making alkyd resins include ortho-phthalic, iso-phthalic, terephthalic, maleic, fumaric, adipic and sebacic acids or their anhydrides. Suitable polyhydric alcohols include ethylene glycol, glycerol, pentaerythritol, 1,2 propylene glycol, trimethylol propane and neopentyl glycol.

As mentioned above, unpromoted autoxidisable binder polymers such as alkyd resins autoxidise far too slowly at ambient temperatures in natural daylight to be of much practical use in architectural paints because they are applied on site as opposed to being applied in a factory where autoxidation can be conveniently accelerated by use of high energy irradiation (eg. actinic irradiation) or by stoving at temperatures well above ambient. Clearly, it is not very practicable to provide high energy irradiation or stoving facilities on site especially for use by unsophisticated users and so architectural coating compositions need to contain promoter systems to accelerate their autoxidation. Typical promoter systems are described (using the alternative name of "driers") on pages 159 and 160 of the 3rd Edition of the book "Introduction to Paint Chemistry and Principles of Technology" by GPA Turner published in 1988 by Chapman and Hall of London. The contents of these pages 159 and 160 are herein incorporated by reference.

As indicated earlier, there are two types of promoter systems commonly employed in architectural paints, namely "surface promoters" and or "through promoters". Surface promoters accelerate autoxidation in the surface layers of an applied coating probably by catalysing the uptake of oxygen and the decomposition of peroxides to form free radicals which cause crosslinking. In contrast, through promoters accelerate the increase in weight average molecular weight of the binder polymer in the lower levels of the coating. Conventional surface promoters comprise carboxylates, preferably octoates, 2-ethyl hexanoates or naphthenates of cobalt, manganese, vanadium, iron, chromium, copper, tin and cerium. Conventional through promoters comprise compounds of the above carboxylates with one or more carboxylates of zirconium, calcium, barium, strontium, lithium, sodium, potassium, zinc, neodymium, bismuth, lead and aluminium as well as alkoxides of aluminium.

To achieve sufficiently fast rates of surface autoxidation, conventional surface promoters are normally used in amounts such that the concentration of their transition metal ions based on the weight of all the autoxidisable binder polymer in the composition is at least 0.001 wt % up to 0.1 wt % with the preferred range being 0.04 to 0.07 wt %. To achieve sufficiently fast rates of presumed autoxidation in the lower levels of a coating, conventional through promoters are normally used in amounts such that the concentration of all their metal ions based on the weight of the autoxidisable binder polymer in the composition is at least 0.3 wt % and generally up to 2 wt % with the preferred range being 0.5 to 1.5 wt %.

Several transition metal ions, notably those of copper, iron, chromium or manganese discolour coating compositions unless the composition is heavily pigmented. Discoloration due to cobalt ions is much less and so cobalt carboxylates have established themselves as the surface promoters ubiquitously used in architectural paints because their use means that it is easier to make the popular light pastel shades of colour. However there are now rumours that cobalt ions may be carcenogenic, and so they should be used only in systems where the concentration of cobalt ions is below 0.01 wt % based on the autoxidisable binder copolymer. Preferably the promoter systems should contain no cobalt ions at all, that is to say they should be non-cobalt promoter systems.

Photoinitiators are often used together with high energy irradiations (often called "actinic" radiation) to accelerate the crosslinking of paints applied under factory conditions. Pages 222 and 223 of Turner, ibid, describe industrial coating compositions containing photoinitiators and either unsaturated polyesters or unsaturated acrylic (including methacrylate) polymers. Turner states that flat articles coated with the, compositions may be conveyed under powerful ultraviolet lamps which irradiate the coated articles with high energy artificial ultraviolet light which decomposes the photoinitiator generating free radicals which harden the coating and create a coherent dried coat. Similarly, United States Patent Specification U.S. Pat. No. 4,387,190 (published in 1983) discloses that a combination of photoiniators and actinic radiation can be used as an alternative to autoxidation, to polymerise coatings containing dicyclopentenyl methacrylates or alkoxy methacrylates. Actinic radiation is high energy radiation of the type conveniently available under factory conditions whereas only daylight or low energy lighting is realistically available on site in a building. This means that those coatings of U.S. Pat. No. 4,38,190 which contain photoinitiators are not architectural coating compositions.

European Patent Specification EP 0 234 641A (published in 1986) discloses autoxidisable coating compositions which contain allyl ether groups in order to permit the use of less volatile solvents. As mentioned above, allyl ether moieties degrade to give acrolein which is a potent lacrimator and so the coating compositions are not suitable for use as architectural coating compositions because architectural coating compositions must be usable by persons not equipped with respirators.

It is an object of this invention to provide an autoxidisable architectural coating composition suitable for application to surfaces at ambient temperatures and natural daylight by unsophisticated users having no respiratory protection which composition contains an autoxidisable binder polymer and promoter system containing low to zero concentrations of cobalt ions for promoting autoxidation of the binder polymer

SUMMARY OF THE INVENTION

Accordingly, this invention provides an autoxidisable architectural coating composition suitable for application to surfaces by unsophisticated users having no respiratory protection at ambient temperatures and in natural daylight which composition contains an autoxidisable binder polymer and a promoter system for promoting surface autoxidation of the autoxidisable binder polymer wherein the system contains
  a) less than 0.01 wt % (preferably 0 wt %) of cobalt ions based on the weight of the autoxidisable binder polymer in the coating composition,
  b) from 0.001 to 0.04 wt % (based on the weight of autoxidisable binder polymer in the coating composition) of metal ions other than cobalt ions, being metal ions which promote surface autoxidation,
  c) at least one photoinitiator activateable by natural daylight preferably present in amounts of from 0.3 to 2 wt % based on the weight of the autoxidisable binder polymer in the composition and most preferably from 0.5 to 1.5 wt %.

The coatings obtained do not suffer from the aggravated yellowing caused by dicyclo-pentenyl moieties. They also have a lower odour than conventional autoxidisable architectural paints and they are certainly not contaminated by acrolein obtained from the degradation of allyl ether groups. The autoxidisable coating composition may also contain other conventional components such as the non-film-forming components mentioned earlier. In particular, they may contain pigment/opacifiers such as rutile (and especially pigment grade rutile) even though pigments might be expected to impede access of light to the photoinitiator.

The metal ions other than cobalt which promote surface autoxidation are preferably manganese and/or vanadium because they promote a faster rate of autoxidation than do other non-cobalt ions. Of these two, manganese is the faster. Metal ions may be also or additionally selected from for example nickel, iron, chromium, copper, tin and cerium. The preferred total concentration of surface autoxidation promoting metal ions in the coating composition is 0.004 to 0.03 wt % based on the weight of the autoxidisable binder polymer in the coating composition.

DETAILED DESCRIPTION

It has been discovered that the use of a low concentration of non-cobalt autoxidation promoting metal ions in combination with at least one photoinitiator achieves rates of autoxidation which are acceptably similar in speed to what can be achieved with conventional cobalt promoter systems. A fast rate of surface autoxidation is indicated by a short period of time needed for the coat to become dry to the touch. This period of time is called the "touch dry time" and a procedure for its measurement is described later. Similarly, a fast rate of presumed autoxidation in the lower levels of the coat is indicated by a short time needed for the coat to resist penetration by a light weight needle. This period is called the "through dry time" and a procedure for its measurement is also described later.

It has been discovered that only low concentrations of manganese or vanadium ions are needed for a successful performance of this invention and so the level of discoloration of the dried coat of paint is at least tolerable and can even be lower than the levels caused by conventional cobalt systems. Discoloration is inversely proportional to the percentage of whiteness in the colour of the dried coat and percentage whiteness can be conveniently measured by conventional spectrophotometric techniques. Therefore percentage whiteness is a convenient inverse measure of discoloration.

Manganese/photoinitiator surface promoter systems frequently have a further advantage when used in gloss paints in that the dried coat of gloss paint usually has a higher specular gloss than corresponding paints containing a conventional cobalt surface promoter system.

Figure 1:
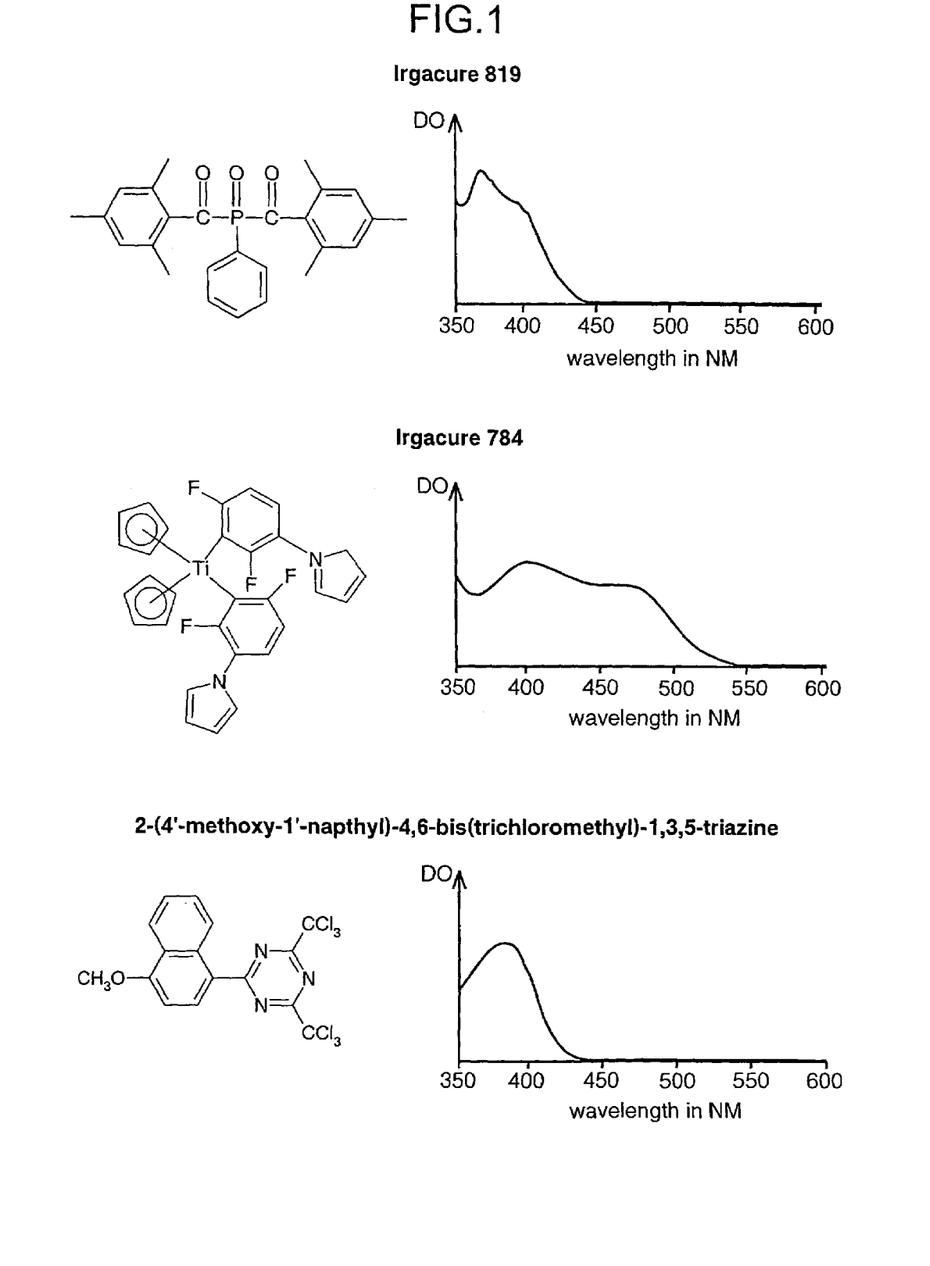
FIGS. 1 and 2 show graphic formulae of photoinitiators together with their absorption spectra.
Figure 2:
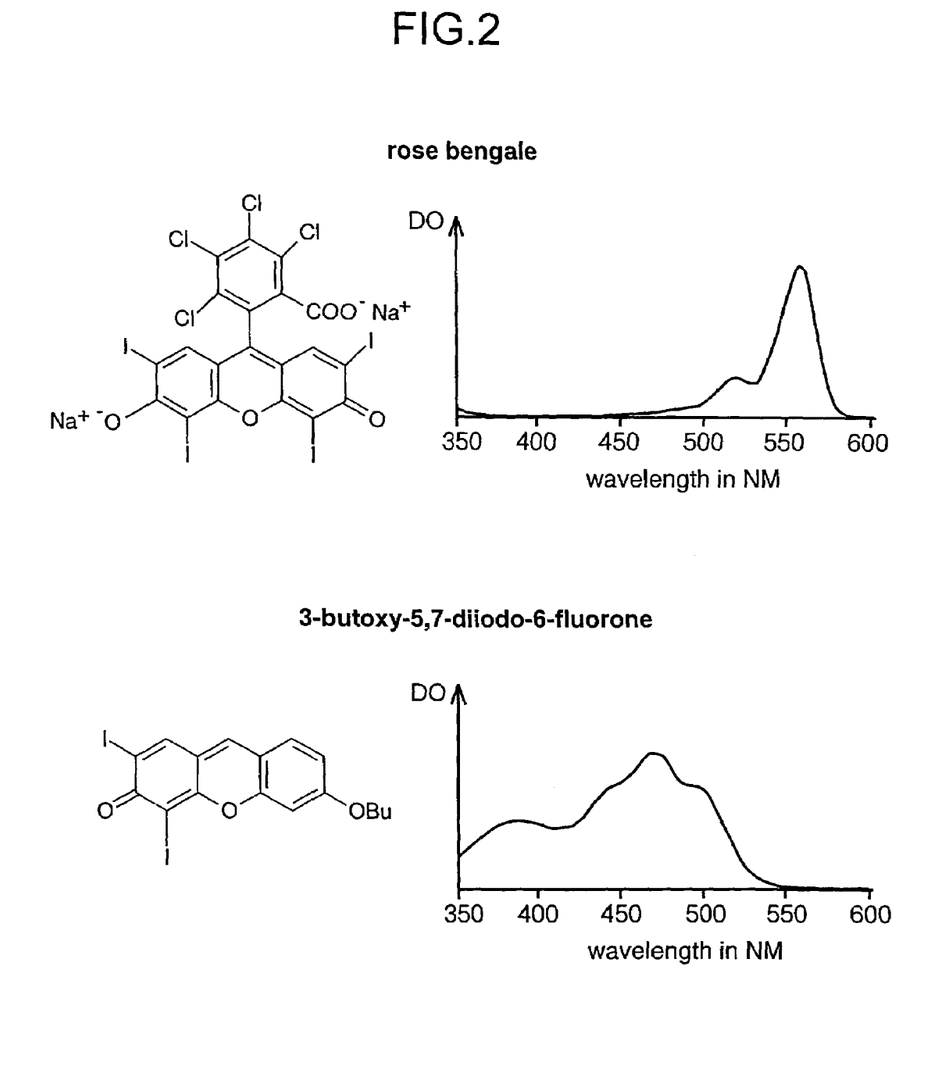

Specular gloss is measured according to British Standard 3900 Part D5 of 1995 using an angle of incidence of either 60° or 20°, but 60° is used for the purposes of this description. The photoinitiator should be activateable by natural daylight comprising light in the wavelength range of 350 to 600 nm (or even to 650 nm) or by similar low energy illumination from lighting sources of the type found in buildings, eg. 40 to 250 watt tungsten filament lamps or fluorescent tubes The graphical formulae of some such photoinitiators together with their absorbance spectra are shown in FIGS. 1 and 2 of the drawings which accompany this description. Some of the photoinitiators are only absorbent in part of the wavelength range and so it is preferred to use them in combination with those which absorb in other parts of the range. A particularly preferred combination comprises dibenzoyl phenyl phosphine oxide and camphorquinone. Other photoinitiators suitable for use with daylight are listed in United States Patent Specification U.S. Pat. No. 6,548,565B issued in 2003 (see the paragraph bridging columns 6 and 7, the contents of which are herein incorporated by reference) or in European Patent Specification EP 1 048 706 published in 2000 (see paragraphs 21 and 22, the contents of which are herein incorporated by reference). The most preferred photoinitiators have significant absorbences of wavelengths not absorbed by rutile.

Preferably the metal/photoinitiator surface promoter systems should be used in combination with at least one of the conventional through promoters. Through promoter systems comprising combinations of any two or all three of zirconium, calcium and lithium carboxylates are especially preferred.

This invention also provides a method for applying a dried coat of an architectural coating composition to a surface in which a coating of the composition is applied to the surface at ambient temperatures wherein the composition contains an autoxidisable binder polymer and a system for promoting surface autoxidation of the autoxidisable binder polymer and wherein the system contains
 a) less than 0.01 wt % (preferably 0 wt %) of cobalt ions based on the weight of the autoxidisable binder polymer in the coating composition,
 b) from 0.001 to 0.04 wt % (based on the weight of autoxidisable binder polymer in the coating composition) of metal ions other than cobalt ions being metal ions which promote surface autoxidation and
 c) at least one photoinitiator activateable by natural daylight preferably present in amounts of from 0.3 to 2 wt % based on the weight of the autoxidisable binder polymer in the composition and most preferably from 0.5 to 1.5 wt %.

and the coating composition is applied to the surface under illumination by light (especially natural daylight) of wavelength in the range 350 to 650 nm. The method can be used on site to coat surfaces found in or around buildings and does not require the use of high energy irradiation and carefully controlled conditions more suited to methods performed in factories.

This description is accompanied by drawings of which

The invention is further illustrated by the following Examples of which Examples A to G are comparative. In the Examples, ambient temperature was about 18° C. and touch dry time and through dry time are measured using the following procedures:

Touch Dry Time Measurement

The time taken for a freshly applied coating to become dry to the touch is measured by a sand deposition procedure as follows:

A flat glass surface was degreased with acetone. The coating whose dry time is to be measured is applied by block spreader at 20° C. and 50% relative humidity to a thickness of 50 to 60 µm. This coating is allowed to dry at 20° C. and 50% relative humidity which were maintained throughout the measurement procedure.

A hopper having a small outlet in its base is filled with sand which then trickles out through the outlet. The drying coating is passed under the hopper outlet at a speed of 25.4 mm/hour while sand trickles onto it. Initially the sand sticks to the coating which is still wet but as time passes, the coating dries and autoxidises and there comes a point when the sand ceases to stick to it. The time taken to reach this point is regarded as the "touch dry time". The point is easily detected by blowing the loose sand from the fully dried coating so as to leave a trail of stuck sand of a length from which the touch dry time is obtained by dividing the length by the speed at which the coating passes under the outlet.

Through Dry Time Measurement: Beck Koller Method

The Beck Koller method measures the through dry time by measuring the time taken for a freshly applied coating to become resistant to penetration by a light weight needle. The method employs the Beck Koller apparatus shown diagrammatically in FIG. 3 and on an exaggerated scale in FIG. 4. The Beck Koller apparatus is available from the Mickle Laboratory Engineering Company of Gomsall in Surrey, England.

Figure 3:
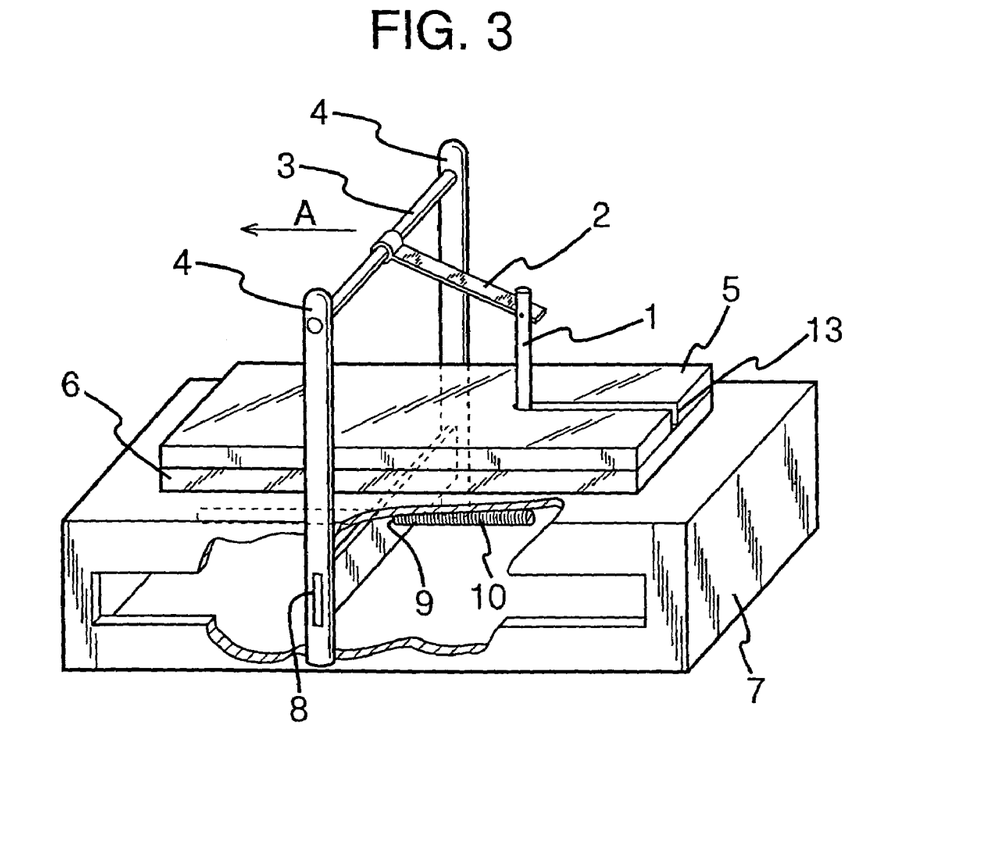
FIG. 3 shows a perspective diagrammatic representation on an exaggerated scale of apparatus used in the "Through Dry Time Measurement" procedure.

FIG. 3 shows a needle 1 carried by an arm 2 attached to a horizontal rod 3 trunnion mounted between parallel vertical transporters 4. Needle 1 penetrates downwards into a coating 5 of coating composition which has been applied to a glass plate 6 which was then laid on metal box 7. Part of box 7 is shown broken away to reveal hole 9 and screw 10. The lower ends of transporters 4 are linked by bar 8 containing thredded hole 9 through which rotatable thredded driving screw 10 passes.

Rotation of screw 10 in an appropriate direction drives transporters 4 and needle 1 in the direction of arrow A. When coating 5 is freshly applied, it is still a viscous liquid and so when needle 1 is at point 11 (see FIG. 4), it can penetrate through coating 5 onto glass plate 6 and create a score 13. As needle 1 continues to move in direction A, drying and autoxidation of coating 5 proceed and its resistance to penetration by needle 1 increases and score 13 becomes less deep until at point 12, the resistance becomes total and no further penetration occurs. The distance from point 11 to point 12 is measured and is used, together with a knowledge of the speed of needle 1, to calculate the time taken to reach point 12. This time is deemed to be the "through dry time".

Figure 4:
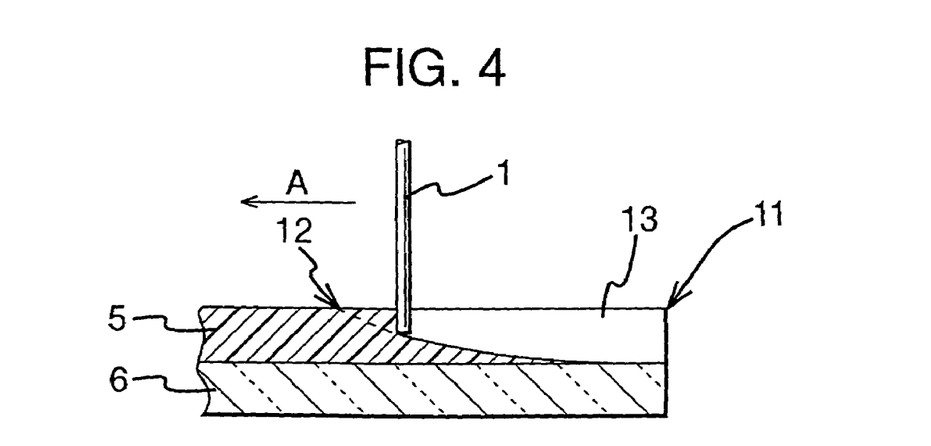
FIG. 4 shows in section on a larger scale a detail from FIG. 3.

Coating 5 is applied to the surface of glass plate 6 as in the Touch Dry Time procedure except that a thickness of 100 μm was applied. Needle 1 is cylindrical having a diameter of 1 mm and a length of 40 mm and bears down on the coating with a force of 4 g weight. Needle 1 travels at a speed of 12.25 mm/hour. Again a temperature of 20° C. and a relative humidity of 50% was maintained throughout the procedure.

EXAMPLE 1

Preparation of a Test Paint, but Omitting a Surface Promoter System

Firstly a bentonite preliminary composition and a rutile preliminary composition were made. The bentonite composition was made by stirring together 10 wt % of bentonite clay, 35 wt % of an autoxidisable long oil alkyd resin and 55 wt % of an aliphatic hydrocarbon solvent. The rutile composition was made by stirring together 68 wt % of pigment grade rutile particles, 21.5 wt % of an autoxidisable long oil alkyd resin and 10.5 wt % of an aliphatic hydrocarbon solvent.

The preliminary compositions together with the other components shown in Table 1 were added in turn to a 5 liter cylindrical mixing vessel provided with stirring paddles. Stirring was performed by rotating the paddles at a speed of 400 rpm during the addition of the components and continued at a speed of 400 rpm for a further 10 minutes. A homogenous test paint was produced to which various surface promoter systems could then be added.

EXAMPLES 2 AND 3

Comparative Example A

Three 300 g quantities of the test paint made in Example 1 were taken and into each was stirred one of the surface promoter systems as shown in Table 2. The amounts of each ingredient of the promoter systems used is also shown in Table 2 expressed as a weight percentage based on the total weight of autoxidisable alkyd binder polymer in the

TABLE 1

FORMULATION OF TEST PAINT SUITABLE FOR SUBSEQUENT ADDITION OF A SURFACE PROMOTER

| Component | wt % Used |
|---|---|
| *Autoxidisable long oil alkyd resin | 34.0 |
| Autoxidisable short oil alkyd resin | 2.9 |
| Bentonite preliminary composition | 2.0 |

TABLE 1-continued

FORMULATION OF TEST PAINT SUITABLE FOR SUBSEQUENT ADDITION OF A SURFACE PROMOTER

| Component | wt % Used |
|---|---|
| Aliphatic hydrocarbon solvent | 2.0 |
| Rutile preliminary composition | 34.25 |
| **Polyamide modified autoxidisable alkyd thixotrope | 16.0 |
| Biocide | 0.4 |
| Zirconium octoate through dry promoter | 1.4 |
| Calcium octoate through dry promoter | 1.69 |
| Lithium octoate through dry promoter | 0.9 |
| Dimethyl silicone oil: flow aid | 0.15 |
| Aliphatic hydrocarbon solvent | 4.31 |

*A long oil alkyd from pentaerythritol, phthalic anhydride and tall oil fatty acid.
**A medium oil alkyd.

TABLE 2

SURFACE PROMOTERS USED

| Example | Metal ions wt % | "Irgacure" 819 wt % | Camphor Quinone wt % |
|---|---|---|---|
| 2 | 0.019 wt % *Mn | 0.53 | 0.53 |
| 3 | 0.019 wt % *Mn | 1.06 | 0.27 |
| A | 0.064 wt % Co | — | — |

"Irgacure" 819 is dibenzoyl phenyl phosphine oxide and is supplied by CIBA Geigy of Basle, Switzerland.
*From "Dappro" 5005 supplied Elementis Plc of Staines, England.

Also, coatings 100 μm thick of the paints were each applied to a glass panel as in the Touch Dry Time procedure and the coats were allowed to dry for 24 hours at 20° C. and a relative humidity of 50%. The specular gloss of each paint was determined using British Standard 3900: Part D5 of 1995 and an angle of 60°. The results are shown in Table 3.

Finally dried coats of the paints applied as for the gloss measurements described above were subjected to whiteness measurements after 1 hour and after 24 hours from application of the coatings. The measurements were made by conventional spectrophotometric techniques and the results obtained are shown in Table 3.

Table 3 shows that the surface and through dry times of the promoter systems containing manganese ions and photoinitiators are tolerable, whilst the gloss factors obtained are marginally better those obtained using a convention cobalt ion promoter system and the whitenesses obtained are significantly higher which means that the manganese/photoinitiator systems cause less discoloration and in particular less yellowing.

TABLE 3

TEST RESULTS

| | Surface Dry Time Hours | | | | Through Dry Time Hours | | | % Whiteness | |
|---|---|---|---|---|---|---|---|---|---|
| | At ambient temperature | | At 8° C. | | | | | | |
| Example | In light | In dark | In light | In dark | At Ambient | At 8° C. | Gloss % | After 1 hour | After 24 hours |
| 2 | 3.25 | 4.5 | 4.75 | 7.75 | 8.5 | 15.5 | 93 | 81.3 | 81.8 |
| 3 | 2.75 | 4.5 | 4.5 | 7.5 | 5.5 | 11 | 92 | 80.3 | 80.6 |
| A | 2 | 2.25 | 4 | 4.75 | 5.5 | 9 | 89 | 76.5 | 74.5 |

Comparative Examples B to F

Significance of Manganese or Photoinitiator

To show the importance of the manganese ions and the photoinitiator, Comparative Examples B, and D to F were performed in which the procedure of Example 3 was repeated except that manganese ions or photoinitiators were omitted in turn as indicated in Table 4. In Comparative Example C, the amount of manganese used was trebled whilst the photoininiators were omitted. The Touch Dry Times achieved both from drying performed in light at ambient temperature and in darkness as in Example 3 are also given in Table 4.

TABLE 4

IMPORTANCE OF MANGANESE AND PHOTOINITIATORS

| Example | Mn | "Irgacure" 819 | Camphor quinone | Touch Dry Time: h In Light | In Dark |
|---|---|---|---|---|---|
| 3 | Yes | Yes | Yes | 3.5 | 6 |
| B | No | Yes | Yes | >12 | >12 |
| C | *Yes | No | No | 3.75 | 3.5 |
| D | Yes | No | No | 6.5 | >8.5 |
| E | Yes | No | Yes | 5.75 | 7.5 |
| F | Yes | Yes | No | 3.5 | 6 |

*0.056 wt % manganese ions were used.

Example F suggests that camphorquinone does not improve touch dry times, so it is added for the benefit of through dry times.

EXAMPLE 4

Preparation of an Alternative Test Paint Again Omitting a Surface Promoter

Firstly, a rutile preliminary composition was made up as in Example 1 and then it was added in turn with the other components shown in Table 5 to a 5 liter mixing vessel of the type used in Example 1. Stirring was performed as in Example 1 to produce an alternative homogenous test paint to which various surface autoxidation promoters could then be added.

EXAMPLES 6 TO 8

Comparative Example G

Four 300 g quantities of the test paint made in Example 5 were taken and into each was stirred one of the vanadium or cobalt surface promoter

TABLE 5

FORMULATION OF AN ALTERNATIVE TEST PAINT SUITABLE FOR SUBSEQUENT ADDITION OF A SURFACE PROMOTER

| Component | Wt % Used |
|---|---|
| *Autoxidisable long oil alkyd resin | 40.3 |
| Aliphatic hydrocarbon solvent | 3.0 |
| Rutile preliminary composition | 34.3 |
| **Polyamide modified autoxidisable alkyd thixotrope | 12.2 |
| Biocide | 0.4 |
| Zirconium octoate through dry promoter | 1.2 |
| Calcium octoate through dry promoter | 1.7 |
| Dimethyl silicone oil: flow aid | 0.1 |
| High boiling aliphatic hydrocarbon solvent | 6.7 |
| | 100.0 |

*A long oil alkyd from pentaerythritol, phthalic anhydride and tall oil fatty acid.
**A medium oil alkyd.

systems as shown in Table 6. The amounts of each ingredient of the promoter systems used are also shown in Table 6 expressed as a weight percentage based on the total weight of autoxidisable alkyd binder polymer in the 300 g quantity. Each of the quantities of paint now containing surface promoter systems were subjected at ambient temperature to surface and through dry time measurements as performed for Examples 2 and 3. The results obtained are given in Table 7.

It will be seen that Examples 7 and 8 relate to promoter systems containing only trace amounts (between 0.001 and 0.007 wt %) of cobalt which are non-notifiable for carcenogenic risk.

TABLE 6

SURFACE PROMOTERS USED

| Example | Metal ions Wt % | "Irgacure" 819 Wt % | Camphor Quinone Wt % |
|---|---|---|---|
| 6 | 0.006 wt % V | 0.5 | 0.25 |
| 7 | 0.006 wt % Co | 0.5 | 0.25 |
| 8 | 0.003 wt % Co | 0.5 | 0.25 |
| G | 0.06 wt % Co | — | — |

TABLE 7

TEST RESULTS

| | Surface Dry Time Hours | Through Dry Time Hours | |
|---|---|---|---|
| Example | In Light | In Light | In Dark |
| 6 | 7.75 | 12 | 11 |
| 7 | — | 7 | 8 |
| 8 | 5.5 | 9 | 7.5 |
| G | 3.25 | 5.5 | 4 |

In a more general application of this invention, especially when discoloration is less significant as with paints of dark colour and/or high chroma, then the photoinitiators may be used with higher concentrations of manganese ions, for example up to 0.1 wt % based on the weight of autoxidisable binder polymer in the composition. This allows for good rates of autoxidation even in paints of strong light absorbing colours and again good gloss levels can achieved. Typically, paints of dark colour and/or high chroma have a lightness/darkness factor of over 60 and a chroma factor of over 70 according to the NCS or Swedish Standard Colour Atlas identified as Swedish Standard 01 91 02.

It is now very desirable that if cobalt ions are to be used as promoters then they are used in trace concentrations below 0.01 wt % based on the weight of autoxidisable binder polymer in the composition. This of course results in a major retardation of the promotion of the autoxidation, but Table 7 shows that the retardation can be at least partially offset by using the cobalt ions in combination with the photoinitiators preferably the concentration of cobalt ions should be at least at least 0.001 wt %. Therefore in a modification of this invention, the surface promoter system comprise from 0.001 to 0.01 wt % cobalt ions and no other metal ions.

The invention claimed is:

1. An autoxidisable architectural coating composition which composition includes an autoxidisable binder polymer and a promoter system for promoting autoxidation of the autoxidisable binder polymer wherein the system comprises: a) metal ions which promote surface autoxidation present in an amount up to 0.04 wt % based on the weight of autoxidisable binder polymer in the coating composition; b) at least one photoinitiator activateable by natural daylight present in amounts of from 0.3 to 2.0 wt % based on the weight of the autoxidisable binder polymer in the composition for the system to promote surface autooxidation of the autoxidisable binder polymer at ambient temperatures; and c) sufficient through promoter for the through promoter to provide to the coating composition from 0.03 to 02 wt % of metal ions from the through promoter based on the weight of the binder polymer in the composition, wherein the composition comprises no cobalt ions.

2. A coating composition according to claim 1 wherein the composition comprises manganese ion, vanadium ion or combinations thereof as surface autoxidation promoters.

3. A coating composition according to claim 1 wherein the composition comprises metal ions selected from nickel, iron, chromium, copper, tin, and cerium as surface autoxidation promoters.

4. A coating composition according to claim 1 wherein the composition contains a benzoyl phenyl phosphine oxide as a photoinitiator.

5. A coating composition according to claim 1 wherein the composition contains camphorquinone as a photoinitiator.

6. A coating composition according to claim 1 wherein a combination of two or more photoinitiators are present in the composition.

7. An autoxidisable architectural coating composition which composition includes an autoxidisable binder polymer and a promoter system for promoting autoxidation of the autoxidisable binder polymer wherein the system comprises: a) metal ions other than cobalt ions being metal ions which promote surface autoxidation present in an amount up to 0.04 wt % based on the weight of autoxidisable binder polymer in the coating composition; b) less than 0.01 wt % of cobalt ions based on the weight of the autoxidisable binder polymer in the coating composition, wherein when the cobalt ions are 0 weight percent the weight percent of the metal ions other than cobalt is from 0.001 to 0.04; c) at least one photoinitiator activateable by natural daylight present in amounts of from 0.3 to 2.0 wt % based on the weight of the autoxidisable binder polymer in the composition for the system to promote surface autooxidation of the autoxidisable binder polymer at ambient temperatures; and d) sufficient through promoter for the through promoter to provide to the coating composition from 0.03 to 0.2 wt % of metal ions from the through promoter based on the weight of the binder polymer in the composition.

8. A coating composition according to claim 7 wherein a combination of two or more photoinitiators are present in the composition.

9. A coating composition according to claim 8 wherein the composition contains camphorquinone as a photoinitiator.

10. A coating composition according to claim 8 wherein the promoter system contains from 0.001 to 0.007 wt % of cobalt ions based on the weight of autoxidisable binder polymer in the coating composition as the only surface autoxidation promoting metal ions.

11. A coating composition according to claim 7 wherein the photoinitiator is a benzoyl phenyl phosphine oxide.

12. A coating composition according to claim 7 wherein the composition comprises manganese ion, vanadium ion or combinations thereof as surface autoxidation promoters.

13. A coating composition according to claim 7 wherein the composition comprises metal ions selected from nickel, iron, chromium, copper, tin, and cerium as surface autoxidation promoters.

* * * * *